(12) United States Patent
Gopisetti et al.

(10) Patent No.: US 11,188,439 B2
(45) Date of Patent: Nov. 30, 2021

(54) USAGE PATTERN VIRTUAL MACHINE IDLE DETECTION

(71) Applicant: VMware, Inc., Palo Alto, CA (US)

(72) Inventors: Aditya Gopisetti, Bangalore (IN); Chandrashekhar Jha, Bangalore (IN); Jobin Raju George, Bangalore (IN); Kumar Gaurav, Bangalore (IN); Jusvinder Singh, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 177 days.

(21) Appl. No.: 15/952,824

(22) Filed: Apr. 13, 2018

(65) Prior Publication Data

US 2019/0317873 A1   Oct. 17, 2019

(51) Int. Cl.
*G06F 9/455* (2018.01)
*G06F 11/34* (2006.01)
*G06F 11/30* (2006.01)

(52) U.S. Cl.
CPC ...... *G06F 11/3423* (2013.01); *G06F 9/45558* (2013.01); *G06F 11/301* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 8,209,687 B2* | 6/2012 | Yuyitung | ............... | G06Q 10/06 718/1 |
| 8,667,500 B1* | 3/2014 | Ji | ......................... | G06F 9/5077 718/105 |
| 8,862,727 B2* | 10/2014 | Jayachandran | ..... | G06F 11/0754 709/224 |
| 8,862,914 B2* | 10/2014 | Kansal | .................. | G06F 1/3203 713/320 |
| 8,874,744 B2* | 10/2014 | Zhang | ................... | H04L 47/125 709/226 |
| 9,298,525 B2* | 3/2016 | Zhu | ..................... | G06Q 10/0639 |

(Continued)

OTHER PUBLICATIONS

Zhang et al. "CLOUDGC: Recycling Idle Virtual Machines in the Cloud", 2017 IEEE, pp. 105-115.*

(Continued)

*Primary Examiner* — Van H Nguyen
(74) *Attorney, Agent, or Firm* — Thomas | Horstemeyer, LLP.; Jason M. Perilla (57) ABSTRACT

The detection of idle virtual machines through usage pattern analysis is described. In one example, a computing device can collect utilization metrics from a virtual machine over time. The utilization metrics can be related to one or more processing usage, disk usage, network usage, and memory usage metrics, among others. The utilization metrics can be separated into a set of training metrics and a set of validation metrics, and a number of clusters can be determined based on the set of training metrics. The clusters can be used to organize the set of validation metrics into groups. Depending upon the number or overall percentage of the utilization metrics assigned to individual ones of the plurality of clusters, it is possible to determine whether or not the virtual machine is an idle virtual machine. Once identified, idle virtual machines can be shut down to conserve processing resources and costs.

19 Claims, 8 Drawing Sheets

(56) References Cited

U.S. PATENT DOCUMENTS

| | | | |
|---|---|---|---|
| 9,547,534 B2* | 1/2017 | Dettori | G06F 9/45558 |
| 9,882,798 B2* | 1/2018 | Padala | H04L 43/10 |
| 10,387,679 B2* | 8/2019 | Getson | H04L 63/20 |
| 2013/0305092 A1* | 11/2013 | Jayachandran | G06F 11/0754 |
| | | | 714/37 |
| 2014/0172371 A1* | 6/2014 | Zhu | G06F 11/0703 |
| | | | 702/185 |
| 2016/0103717 A1* | 4/2016 | Dettori | G06F 9/542 |
| | | | 719/318 |
| 2017/0212789 A1* | 7/2017 | Vega | G06F 9/5027 |

OTHER PUBLICATIONS

Chandara SN et al. "A Study on Implementation of Idle Network Memory Virtualization for Cloud", 2011 IEEE, pp. 53-58.*

Jacobs et al. "Towards a Metrics Based Verification and Validation Maturity Model", 2002 IEEE, pp. 1-6.*

\* cited by examiner

USAGE PATTERN VIRTUAL MACHINE IDLE DETECTION

BACKGROUND

A virtual machine is a computing system in which certain hardware or software components are, at least in part, emulated. Through emulation, a virtual machine can perform many of the same tasks that a physical computing system can, such as execute an operating system and applications. A virtual machine can be embodied using a set of specification and configuration files, for example, and is supported by the physical resources of a host computing device. Many different virtual machines can be supported by the physical resources of the same host computing device, which are shared among the virtual machines.

A hypervisor or virtual machine monitor executing on the host computing device can be used to create and manage a number of virtual machines. The hypervisor presents a virtual operating platform for each of the virtual machines and, to some extent, manages the execution of an operating system on each of the virtual machines.

The use of virtual machines is becoming more common, particularly in large data centers, with the evolution of virtualization technology. Virtual machines are often created to perform different tasks or serve different purposes, such as development, testing, the execution of processes, and other purposes. The use of virtual machines offers a number of advantages, such as allowing multiple operating system environments to be executed on the same host computing device through different virtual machines without interactions between them (i.e., in sandboxed environments), ease in management and maintenance of a relatively large number of

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

As noted above, virtual machines are often created to perform different tasks or serve different purposes, such as development, testing, the execution of particular processes, and other purposes. In many cases, a virtual machine is instantiated for a very particular, short term purpose, such as to test a software update, verify software or hardware compatibility, conduct monitoring activities, or perform system analysis. Engineers can sometimes forget to shut down and remove these virtual machines from host computing devices. At any given time, a host computing device may be hosting a number of idle virtual machines that no longer serve any particular purpose, unnecessarily wasting processing, memory, and network communication resources.

Various tools exist to plan, manage, and scale the use of virtual machines hosted by large computing environments in data centers through unified performance monitoring, management, and optimization dashboards. These tools can help engineers optimize performance, availability, and costs in data centers. However, the existence of idle virtual machines has continued to present a problem for the management of data centers. Conventional techniques have failed to accurately and consistently identify idle virtual machines that no longer serve a purpose. These idle virtual machines have continued to drain computing resources in data centers, increasing costs. The sheer number of these idle virtual machines and the inability of technicians to gather sufficient information regarding whether or not any given virtual machine is idle and should be shut down has been a persistent problem.

In this context, idle virtual machine detection through usage pattern analysis is described herein. In one example, a computing device can collect utilization metrics from a virtual machine over time. The utilization metrics can be related to one or more of processing usage, disk usage, network usage, and memory usage metrics, among others. The utilization metrics can be separated into a set of training metrics and a set of validation metrics, and a number of clusters can be determined based on the set of training metrics. The clusters can be used to organize the set of validation metrics into groups. Depending upon the number or overall percentage of the utilization metrics assigned to individual ones of the plurality of clusters, it is possible to determine whether or not the virtual machine is an idle virtual machine. Once identified, idle virtual machines can be shut down to conserve processing resources and costs.

Figure 1:
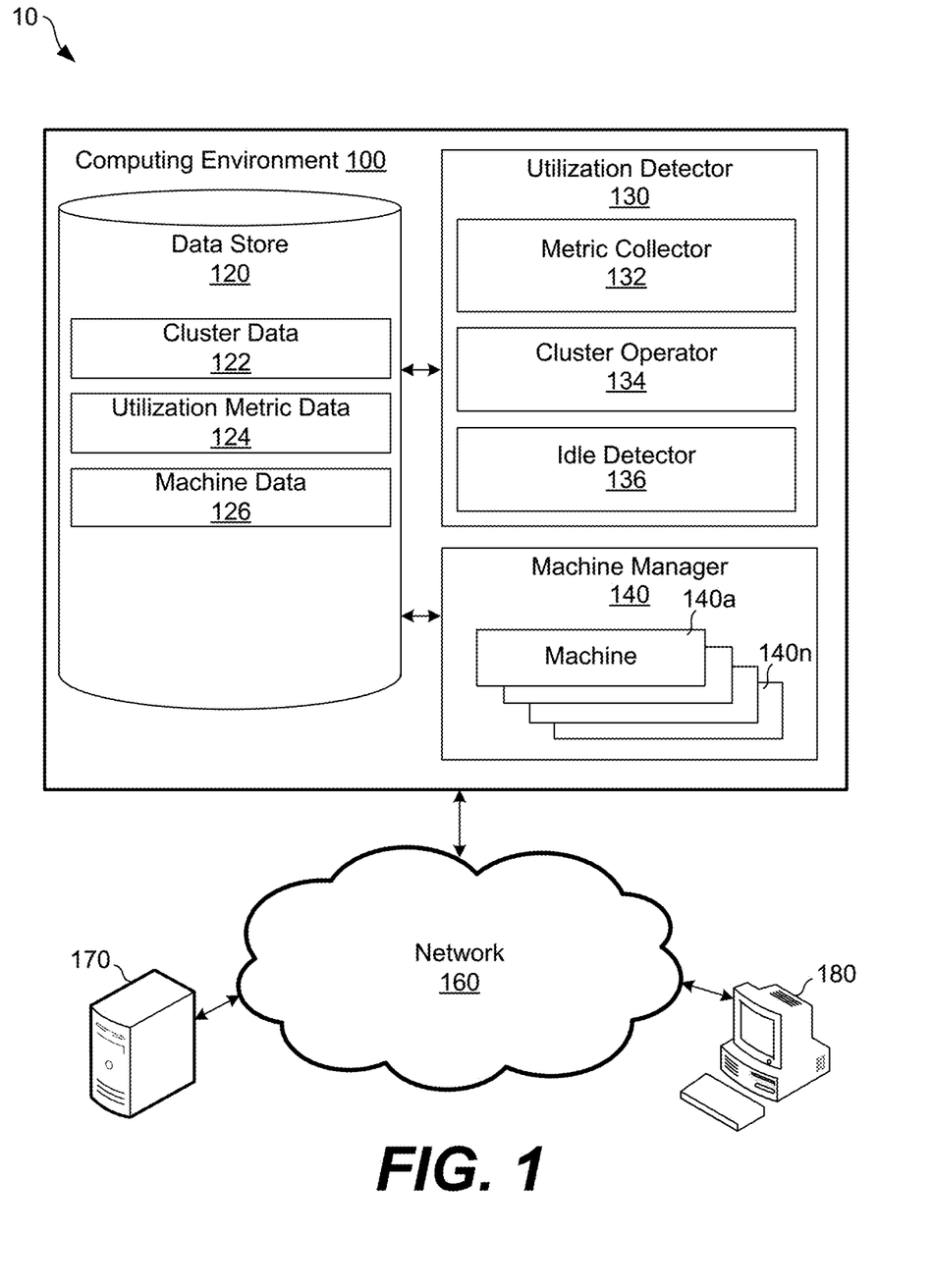
FIG. 1 illustrates an example networked environment for idle virtual machine detection through usage pattern analysis according to various examples described herein.

Turning to the drawings, the following paragraphs provide an outline of a networked environment followed by a discussion of the operation of the same. FIG. 1 illustrates an example networked environment 10 for idle virtual machine detection through usage pattern analysis according to various examples described herein. Among others not illustrated, the networked environment 10 includes a computing environment 100, a network 160, a host computing device 170, and a client computing device 180. The computing environment 100, host computing device 170, and client computing device 180 can be communicatively coupled together through the network 160.

The computing environment 100 can be embodied as a computer, computing device, or computing system. In certain embodiments, the computing environment 100 can include one or more computing devices arranged, for example, in one or more server or computer banks in a data center. The computing device or devices can be located at a single installation site or distributed among different geographical locations. The computing environment 100 can include a plurality of computing devices that together embody a hosted computing resource, a grid computing resource, or other distributed computing arrangement. In some cases, the computing environment 100 can be embodied as an elastic computing resource where an allotted capacity of processing, network, storage, or other computing-related resources vary over time. As further described below, the computing environment 100 can also be embodied, in part, as certain functional or logical (e.g., computer-readable instruction) elements or modules. Those elements can be executed to direct the computing environment 100 to perform aspects of idle virtual machine detection as described herein.

The network 160 can include the Internet, intranets, extranets, wide area networks (WANs), local area networks (LANs), wired networks, wireless networks, cable networks, satellite networks, other suitable networks, or any combinations thereof. The computing environment 100, the host computing device 170, and the client computing device 180 can, respectively, be coupled to one or more public or private LANs or WANs and, in turn, to the network 160 for communication of data among each other. Although not shown in FIG. 1, the network 160 can also include network connections to any number and type of network hosts or devices, such as website servers, file servers, cloud computing resources, databases, data stores, or any other network or computing architectures.

In the networked environment 10, the computing environment 100, the host computing device 170, and the client computing device 180 can communicate with each other through various public or private application programming interfaces (APIs) or other suitable interfaces. Such communications can occur using various data transfer protocols and systems interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The host computing device 170 can be embodied as a computer, computing device, or computing system. The host computing device 170 can include one or more computing devices arranged, for example, in one or more server or computer banks in a data center. In some cases, the host computing device 170 can be similar to the computing environment 100 but located at a different location.

The client computing device 180 can be embodied as any computing device, including those in the form of a desktop computer, laptop computer, personal digital assistant, cellular telephone, tablet computer, or other related computing device or system. As described herein, the client computing device 180 can be used to interface with the computing environment 100. For example, a user of the client computing device 180 can monitor and control the operations of the computing environment 100 for the purpose of idle virtual machine detection.

As shown in FIG. 1, the computing environment 100 includes a data store 120. The data store 120 includes memory areas to store cluster data 122, utilization metric data 124, and machine data 126. The computing environment 100 also includes a utilization detector 130 and a machine manager 140. The utilization detector 130 includes a metric collector 132, a cluster operator 134, and an idle detector 136, the operations of each of which is described in further detail below.

The machine manager 140 can be embodied as a hypervisor or virtual machine monitor executing on the computing environment 100. In that context, the machine manager 140 can be used to instantiate, manage, shut down, and uninstall a number of virtual machines hosted on the computing environment 100, including the virtual machines referenced as 140a-140n in FIG. 1. The machine manager 140 can present a virtual operating platform for each of the virtual machines 140a-140n and, at least in part, manage the execution of system software executing on each of the virtual machines 140a-140n.

As described in further detail below, the metric collector 132 is configured to collect utilization metrics associated with one or more of the virtual machines 140a-140n over time. The metric collector 132 is also configured to store the utilization metrics in the utilization metric data 124 for further processing. A group or set of utilization metrics collected for any one of the virtual machines 140a-140n, among others, can be used to determine whether or not the virtual machine is idle or being utilized as described herein. The metric collector 132 can also collect utilization metrics associated with virtual machines executing on a host computing device other than the computing environment 100, such as on the host computing device 170. In that way, the utilization detector 130 can be relied upon to evaluate virtual machines and detect idle virtual machines hosted in other computing environments.

As one example, the machine manager 140 can monitor the virtual machines 140a-140n, collect utilization data related to the usage of various system resources by the virtual machines 140a-140n, and store that usage data in the data store 120 as utilization metrics. In that case, the metric collector 132 can reference the data store 120 for the utilization metrics of one or more of the virtual machines 140a-140n. As an alternative, the metric collector 132 can query the machine manager 140 through an API interface with the machine manager 140, or interface with the machine manager 140 in other suitable ways, to directly obtain utilization metrics. The metric collector 132 can collect any number of utilization metrics for one or more of the virtual machines 140a-140n in a periodic or aperiodic fashion, over any period of time. Sampling of the utilization metrics can occur at any interval of time, such as every second, minute, every ten minutes, every hour, etc., for days, weeks, or other period of time. Sampling of the utilization metrics can also occur at random times over any period of time. An example of the number of utilization metrics sampled for one of the virtual machines 140a-140n may be 4,000 utilization metrics, although a greater or lesser number can be relied upon.

The utilization metrics can be related to one or more resource utilization or usage metrics, such as central processing unit (CPU) usage, disk input/output (I/O) usage, network I/O usage, and memory usage metrics. The utilization metrics can be gathered in any suitable unit of measure, such as processing speed or clock cycles (e.g., MHz, GHz, etc.), data usage or throughput (e.g., Mb, Mb/sec., etc.), or other unit(s) of measure. The utilization metrics can also be related to other qualitative or quantitative metrics, such as processing or data throughput speeds, processing delays, data synchronization tasks, user logins, number of function calls, number of API calls, traffic to or from certain network ports, and other types of usage information.

In some cases, a combination of two or more different types of utilization metrics can be collected from the same one of the virtual machines 140a-140n at the same time. Two or more different types of utilization metrics, such as memory utilization and CPU utilization, can be collected or sampled from virtual machine 140a, for example, at the same time. When two or more different types of utilization metrics are gathered, a point where those different metrics intersect can be plotted in a two-, three- or multi-dimensional chart or plot. Examples of two-dimensional plots of memory and CPU utilization metrics are shown in FIGS. 2-7.

The metric collector 132 is also configured to remove or discard outlier utilization metrics, although it may not be necessary to do so in every case. As an example, the metric collector 132 can remove or discard any utilization metrics which are not representative of the actual usage of the resources of the virtual machines 140a-140, such as metrics that are too large (e.g., above a threshold) or too small (e.g., below a threshold) to be representative. As another example, the metric collector 132 can remove or discard any utilization metrics which are significantly different (e.g., by a threshold amount or number of standard deviations, etc.) than a mean, median, or mode of the collected utilization metrics for one of the virtual machines 140a-140n. The metric collector 132 is also configured to normalize the utilization metrics so that the data can be processed by the cluster operator 134 in a uniform manner.

Once the utilization metrics are collected by the metric collector 132 for the virtual machines 140a-140n, the cluster operator 134 is configured to process them for evaluation by the idle detector 136. To that end, the metric collector 132 is configured to separate the utilization metrics for one of the virtual machines 140a-140n into a smaller set of training metrics and a larger set of validation metrics. As one example, a group of 5% or 10% of the total number of utilization metrics collected for the virtual machine 140a can be separated into a set of training metrics, and the remaining utilization metrics can be reserved as a set of validation metrics. The primary purpose of the set of training metrics can be to establish clusters for organizing the set of validation metrics for evaluation by the idle detector 136.

The cluster operator 134 is further configured to determine a number of clusters based on the set of training metrics of the virtual machine 140a. While several examples are provided below with four clusters, any suitable number of clusters can be used. Each cluster is associated with a center defined by a different amount of resource usage. For example, a cluster can have a center defined by a certain amount (or possibly range) of memory usage and a certain amount of CPU usage, and other clusters can have centers defined by other amounts of memory and CPU usage. The establishment of the clusters for the virtual machine 140a, including the determination of the centers of each of the clusters based on the set of training metrics, is described in further detail below with reference to FIG. 3.

Once the clusters are established for the virtual machine 140a, the cluster operator 134 is further configured to assign the utilization metrics among the set of validation metrics to one of the clusters. Each utilization metric can be assigned to one of the clusters based on proximity to (or distance from) the centers of the clusters, as measured by metric usage. For example, a utilization metric associated with a certain amount of memory utilization and CPU utilization may be closest in metric usage to the center of a third of four clusters. In that case, the utilization metric would be assigned to the third cluster.

After the utilization metrics of the virtual machine 140a are assigned to the clusters, the idle detector 136 is configured to compute a percentage of utilization metrics assigned to each of the clusters. The idle detector 136 is also configured to determine whether the virtual machine 140a is idle or utilized based on an evaluation of the number or percentage of utilization metrics assigned to each of the clusters. In one example, the idle detector 136 can determine that the virtual machine 140a is an idle virtual machine when a percentage of utilization metrics assigned to one of the clusters (among the total number of utilization metrics assigned to all the clusters) is equal to or greater than a configurable predetermined percentage, such as 50%, 60%, or 70%. In that case, the percentage of utilization metrics assigned to one of the clusters is larger than that assigned to all of the other clusters. In another example, the idle detector 136 can determine that the virtual machine 140a is a utilized (i.e., not idle) virtual machine when the percentage of utilization metrics assigned to two or more of the plurality of clusters is equal to or greater than a configurable predetermined percentage, such as 25%, 33%, or 40%.

The idle detector 136 can send a notification to an administrator or owner of the virtual machine 140a if it is determined to be idle. Additionally or alternatively, the utilization detector 130 can instruct the machine manager 140 to shut the virtual machine 140a down if it is determined to be idle. On the other hand, if the virtual machine 140a is determined to be a utilized machine, the idle detector 136 can work with the machine manager 140 to migrate the virtual machine 140a to another host computing device, such as the host computing device 170.

Figure 2:
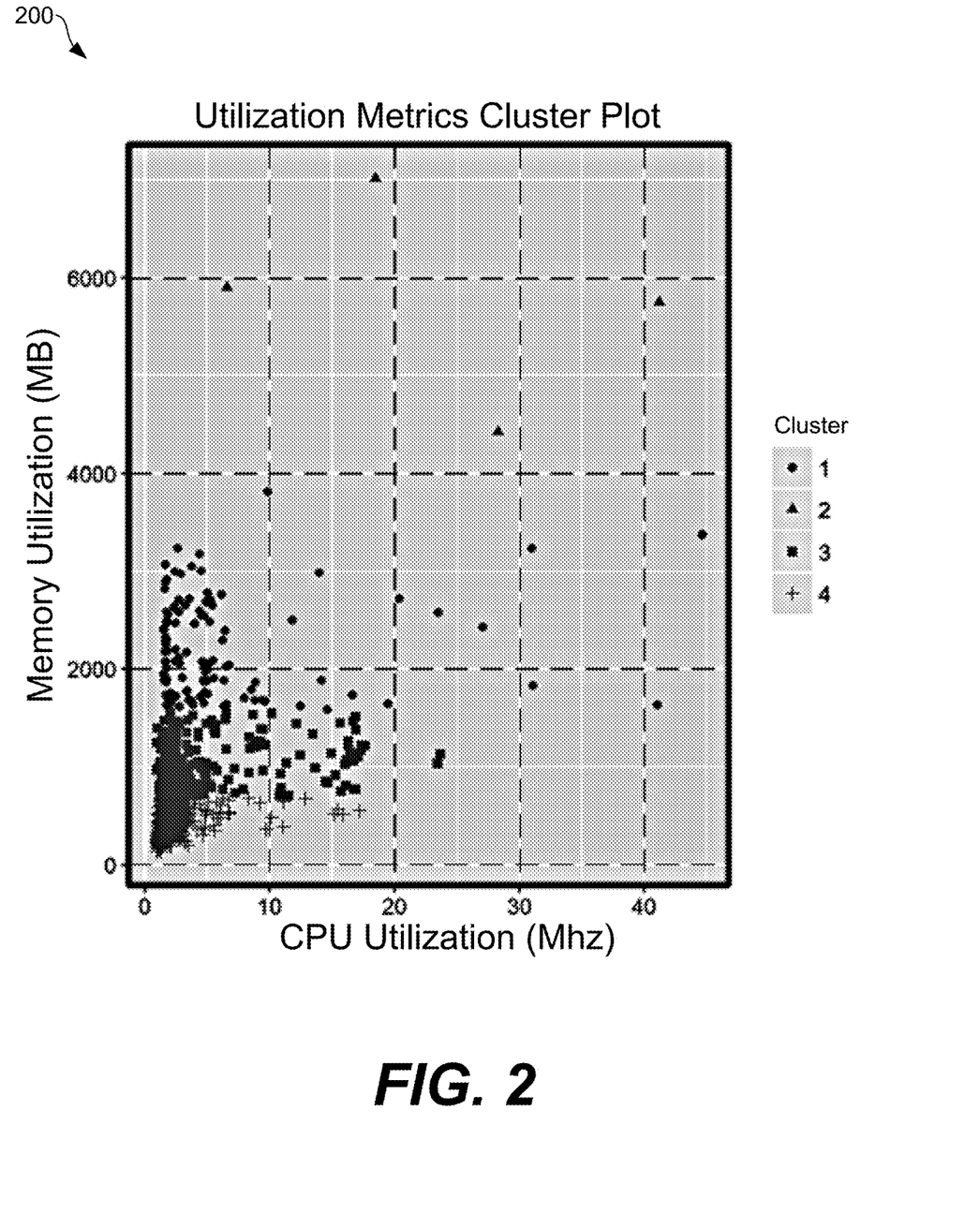
FIG. 2 illustrates an example of a cluster plot of utilization metrics processed by the computing environment shown in FIG. 1 according to various examples described herein.

FIG. 2 illustrates an example cluster plot 200. The cluster plot 200 is illustrated for the purpose of a discussion of the type of analysis performed by the computing environment 100 shown in FIG. 1. The cluster plot 200 includes a range of CPU utilization along the horizontal axis and a range of memory utilization along the vertical axis. However, the evaluation of virtual machines using the concepts described herein is not limited to the evaluation of memory and CPU usages. Instead, as noted above, any type of usage metrics can be collected and evaluated by the utilization detector 130.

The cluster plot 200 shown in FIG. 2 includes a plot of 4,258 utilization metrics, each plotted as a point at an intersection of the memory utilization value and the CPU utilization value associated with it. Each of the utilization metrics has also been assigned to a respective cluster, as identified in the legend shown in FIG. 2 and Table 1 below. The centers (or boundaries) of the clusters are not illustrated in FIG. 2.

TABLE 1

Assignment of Utilization Metrics to Clusters in FIG. 2

| | Cluster Number | | | |
| --- | --- | --- | --- | --- |
| | 1 | 2 | 3 | 4 |
| Number of Utilization Metrics Assigned | 109 | 4 | 510 | 1868 |
| Percentage of Utilization Metrics Assigned | 4.3757527 | 0.160578 | 20.47371 | 74.9899639 |

Referring to Table 1, it can be seen that nearly 75% of the utilization metrics plotted in FIG. 1 are assigned to cluster number 4. In a case such as this, the idle detector 136 can determine that the virtual machine from which the utilization metrics were collected is an idle virtual machine. The gathering of 75% of the utilization metrics in cluster number 4 means that the resource usage of the virtual machine does not vary significantly over time, which is an indicator that the virtual machine is idle. Other assignments of utilization metrics to clusters are shown in FIGS. 4-7 and described below.

Figure 3:
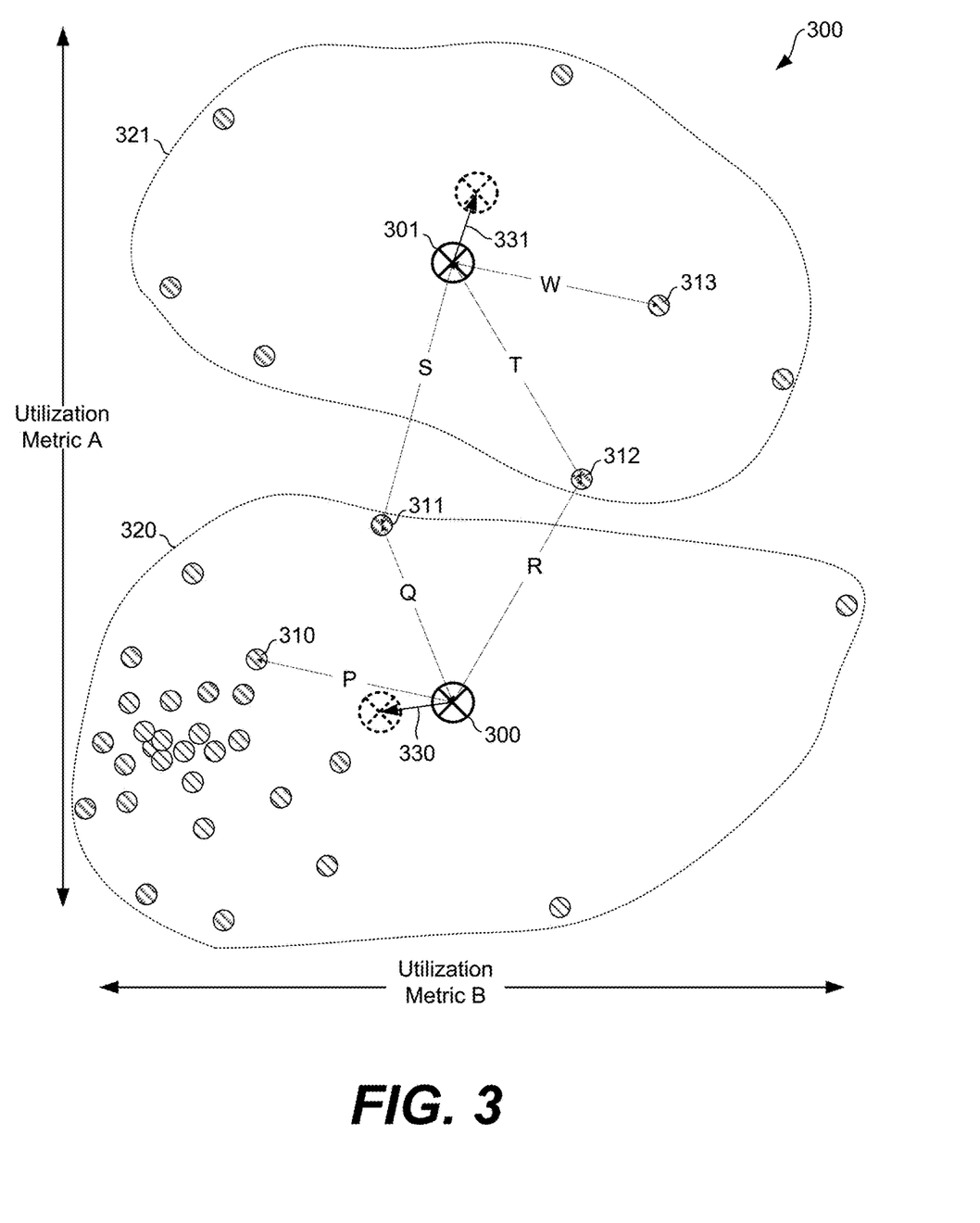
FIG. 3 illustrates an example of how a cluster operator of the computing environment shown in FIG. 1 can determine clusters and assign utilization metrics to the clusters according to various examples described herein.

FIG. 3 illustrates an example of how the cluster operator 134 can determine clusters and assign utilization metrics to the clusters. In FIG. 3, centers 300 and 301 of two clusters are illustrated, along with a number of representative utilization metrics among the set of training metrics, four of which are designated by reference numerals 310-313. Although the centers 300 and 301 of two clusters are illustrated, the concepts described herein can apply to the use of any number of clusters. FIG. 3 also illustrates the centers 300 and 301 being plotted in a metric space defined by utilization metric A and utilization metric B, each of which is representative of a different type of resource usage. For example, the utilization metric A can be representative of processing unit utilization, disk I/O utilization, network I/O utilization, memory utilization, or another type of resource utilization by a virtual machine. Similarly, the utilization metric B can be representative of another type of resource utilization by the virtual machine.

The cluster operator 134 is configured to initialize the centers 300 and 301 of the clusters. Each of the centers 300 and 301 of the clusters (among the centers of additional clusters not shown in FIG. 3) can be initialized to have a different position determined according to the intersection of utilizations of metrics A and B. The cluster operator 134 can, initially, distribute the centers of each of the clusters evenly (or relatively evenly) among each other, with respect to a largest range of all of the utilization metrics in the set of training metrics. The centers 300 and 301 of the clusters are shown at their initials positions in FIG. 3.

The cluster operator 134 is also configured to update the centers 300 and 301 based on the positions of the set of training metrics. To that end, the cluster operator 134 can calculate the distances between each of the utilization metrics shown in FIG. 3 and the centers 300 and 301 of the clusters (among the centers of other clusters not shown in FIG. 3). Example distances P-T are shown in FIG. 3. Because the distance Q between the utilization metric 311 and the center 300 is shorter than the distance S between the utilization metric 311 and the center 301, the cluster operator 134 can associate or assign the utilization metric 311 with the center 300. Similarly, because the distance T between the utilization metric 312 and the center 301 is shorter than the distance R between the utilization metric 312 and the center 300, the cluster operator 134 can associate or assign the utilization metric 311 with the center 301. In all, the utilization metrics within the boundary 320 are assigned to the cluster having center 300, and the utilization metrics within the boundary 321 are assigned to the cluster having center 301.

To update the position of the cluster having the center 300, the cluster operator 134 can calculate an average of the distances between all the utilization metrics within the boundary 320 and the initial location of the center 300. That average can be used to update or offset the initial position of the center 300. A representative offset 330 to the center 300 is shown in FIG. 3. Similarly, to update the position of the cluster having the center 301, the cluster operator 134 can calculate an average of the distances between all the utilization metrics within the boundary 321 and the initial location of the center 301. That average can be used to update or offset the initial position of the center 301. A representative offset 331 to the center 301 is shown in FIG. 3. The process of updating the positions of the centers 300 and 301 can repeat in this way until the positions of the centers 300 and 301 converge. This process of initializing and updating the centers of clusters can, in one case, be performed based on only the set of training metrics, without reference to the set of validation metrics, to reduce processing demands. Alternatively, process of initializing and updating can occur for all utilization metrics collected for any given virtual machine.

After the positions of the centers 300 and 301 of the clusters (among others) are determined based on the set of training metrics, the cluster operator 134 can assign each utilization metric from the set of validation metrics to one of the clusters. The cluster operator 134 can assign each utilization metric to the cluster having the closest center, measured based on the values of the utilization metrics. In that way, each utilization metric from the set of validation metrics is assigned a cluster, resulting in an assignment similar to that shown in FIGS. 2 and 4-7.

Figure 4:
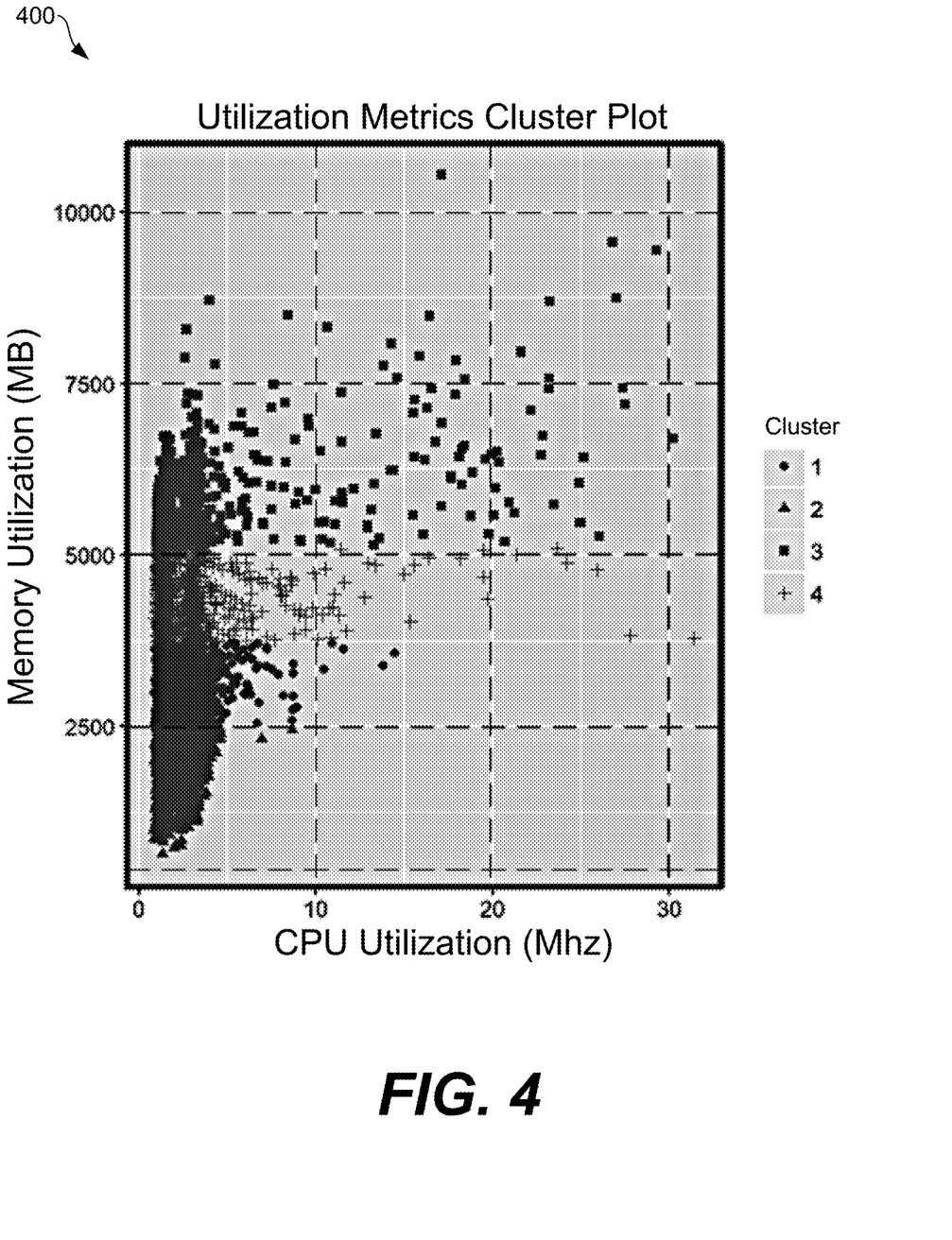
FIGS. 4-7 illustrate additional examples of cluster plots processed by the computing environment shown in FIG. 1 according to various examples described herein.

FIG. 4 illustrates an example cluster plot 400 having a range of CPU utilization along the horizontal axis and a range of memory utilization along the vertical axis. The cluster plot 400 includes a plot of 4,293 utilization metrics, each plotted as a point at an intersection of the memory utilization value and the CPU utilization value associated with it. Each of the utilization metrics has also been assigned to a respective cluster, as identified in the legend shown in FIG. 4 and Table 2 below.

TABLE 2

Assignment of Utilization Metrics to Clusters in FIG. 4

| | Cluster Number | | | |
|---|---|---|---|---|
| | 1 | 2 | 3 | 4 |
| Number of Utilization Metrics Assigned | 1275 | 1327 | 721 | 970 |
| Percentage of Utilization Metrics Assigned | 29.6995108 | 30.910785 | 16.7947822 | 22.594922 |

Referring to Table 2, it can be seen that the assignment of the utilization metrics is relatively distributed across all the clusters 1-4. In a case such as this, the idle detector 136 can determine that the virtual machine from which the utilization metrics were collected is a utilized virtual machine. The idle detector 136 can determine that the virtual machine is being utilized because the percentage of utilization metrics assigned to two or more of the clusters 1-4 is equal to or greater than 33%, for example (and no one cluster is associated with more than, e.g., 70% of the utilization metrics). The spread of the utilization metrics across the clusters 1-4 means that the resource usage of the virtual machine varies over time, which is an indicator that the virtual machine is utilized.

Figure 5:
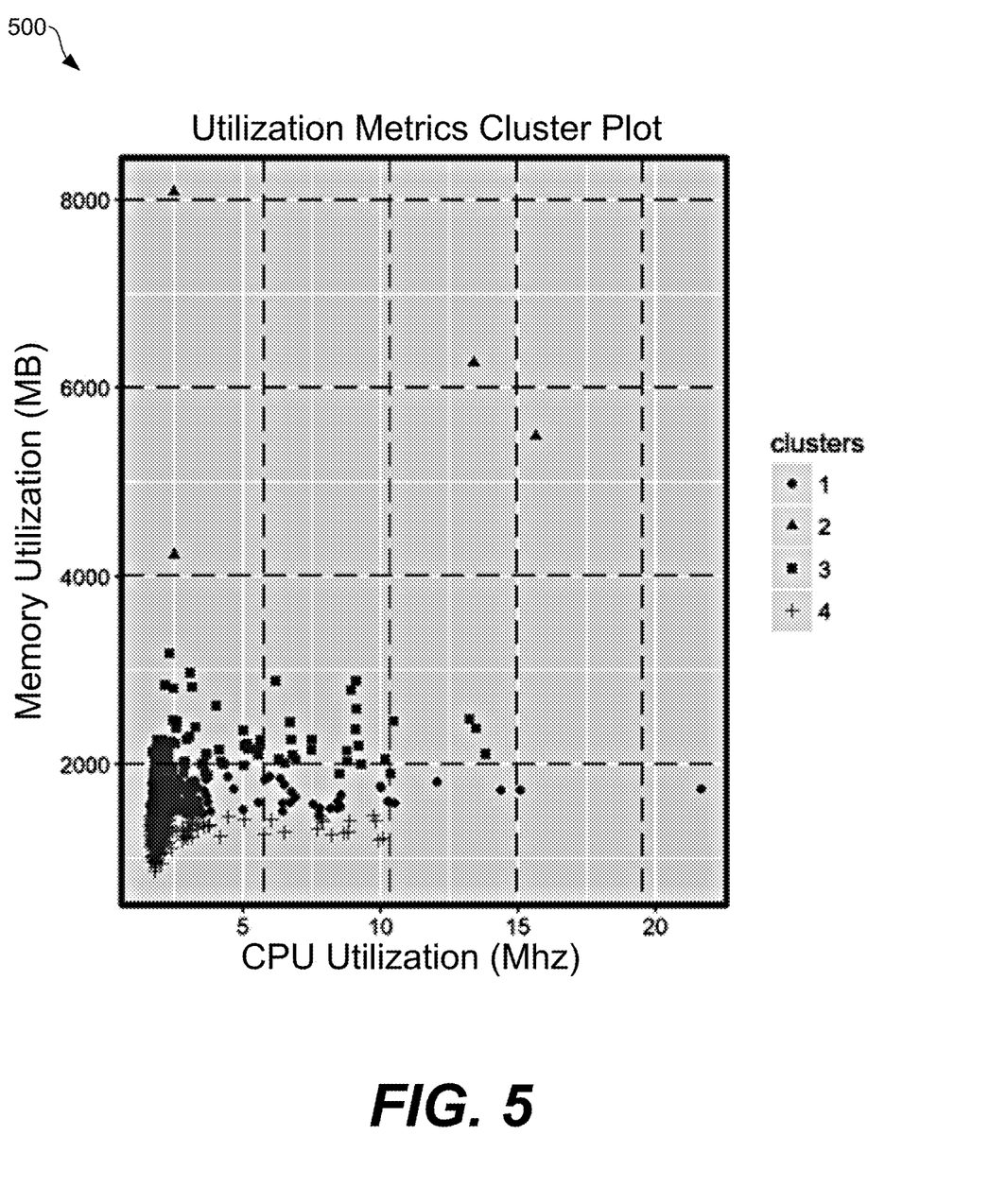

FIG. 5 illustrates an example cluster plot 500 having a range of CPU utilization along the horizontal axis and a range of memory utilization along the vertical axis. The cluster plot 500 includes a plot of 1354 utilization metrics, each plotted as a point at an intersection of the memory utilization value and the CPU utilization value associated with it. Each of the utilization metrics has also been assigned to a respective cluster, as identified in the legend shown in FIG. 5 and Table 3 below.

TABLE 3

Assignment of Utilization Metrics to Clusters in FIG. 5

| | Cluster Number | | | |
|---|---|---|---|---|
| | 1 | 2 | 3 | 4 |
| Number of Utilization Metrics Assigned | 567 | 4 | 143 | 640 |
| Percentage of Utilization Metrics Assigned | 41.875923 | 0.295421 | 10.5612999 | 47.267356 |

Referring to Table 3, it can be seen that the assignment of the utilization metrics is distributed between clusters 1 and 4. In a case such as this, the idle detector 136 can determine that the virtual machine from which the utilization metrics were collected is a utilized virtual machine. The idle detector 136 can determine that the virtual machine is being utilized because the percentage of utilization metrics assigned to two or more of the clusters 1-4 is equal to or greater than 33%, for example (and no one cluster is associated with more than, e.g., 70% of the utilization metrics). The spread of the utilization metrics across at least clusters 1 and 4 means that the resource usage of the virtual machine varies over time, which is an indicator that the virtual machine is utilized. The virtual machine may be executing a continuous process, for example.

Figure 6:
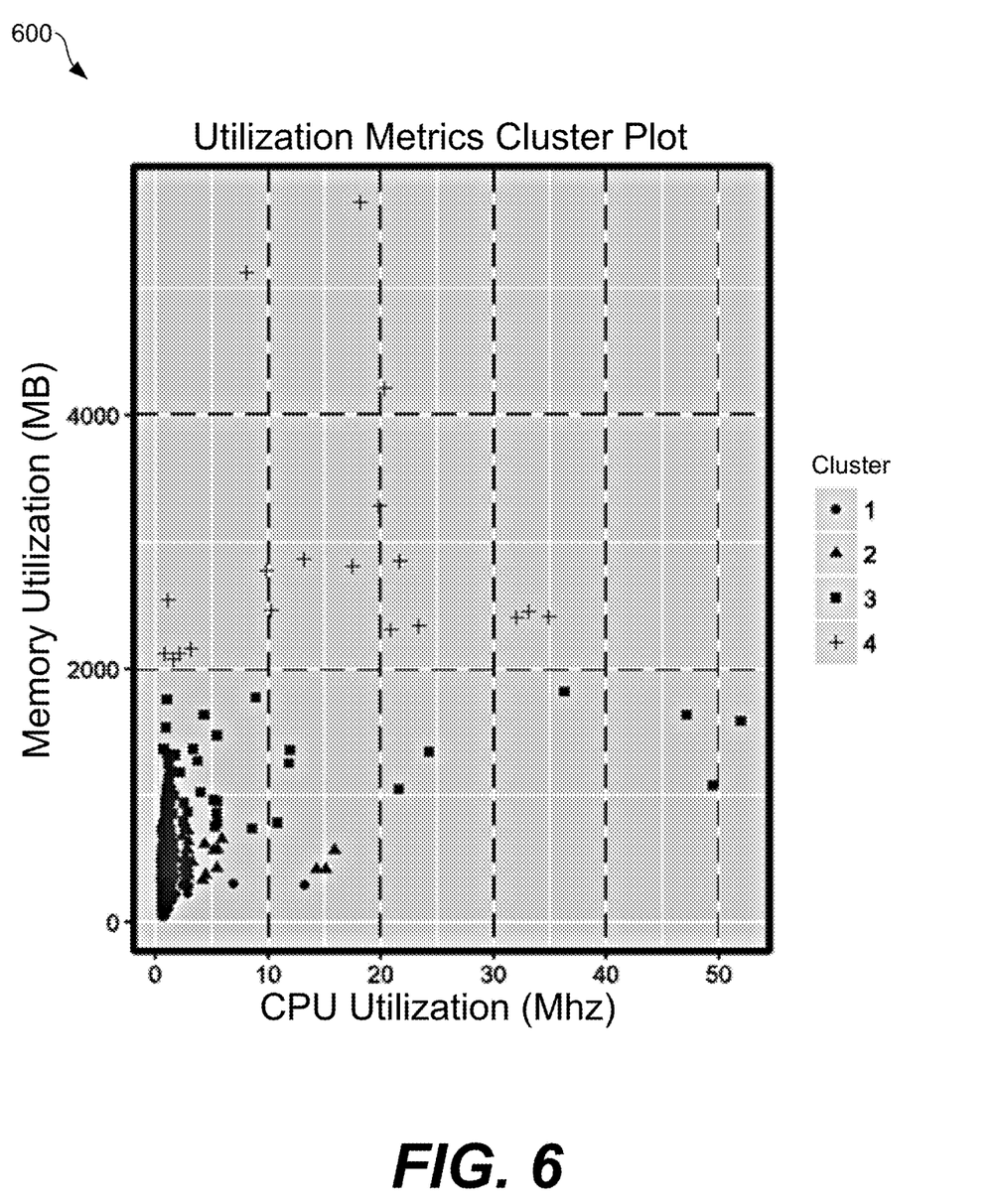

FIG. 6 illustrates an example cluster plot 600 having a range of CPU utilization along the horizontal axis and a range of memory utilization along the vertical axis. The cluster plot 600 includes a plot of 4,258 utilization metrics, each plotted as a point at an intersection of the memory utilization value and the CPU utilization value associated with it. Each of the utilization metrics has also been assigned to a respective cluster, as identified in the legend shown in FIG. 6 and Table 4 below.

TABLE 4

Assignment of Utilization Metrics to Clusters in FIG. 6

| | Cluster Number | | | |
|---|---|---|---|---|
| | 1 | 2 | 3 | 4 |
| Number of Utilization Metrics Assigned | 3239 | 896 | 104 | 19 |
| Percentage of Utilization Metrics Assigned | 76.068577 | 21.04274 | 2.442461 | 0.446219 |

Referring to Table 4, it can be seen that over 75% of the utilization metrics plotted in FIG. 6 are assigned to cluster number 1. In a case such as this, the idle detector 136 can determine that the virtual machine from which the utilization metrics were collected is an idle virtual machine. The gathering of over 75% of the utilization metrics in cluster number 1 means that the resource usage of the virtual machine does not vary significantly over time, which is an indicator that the virtual machine is idle.

Figure 7:
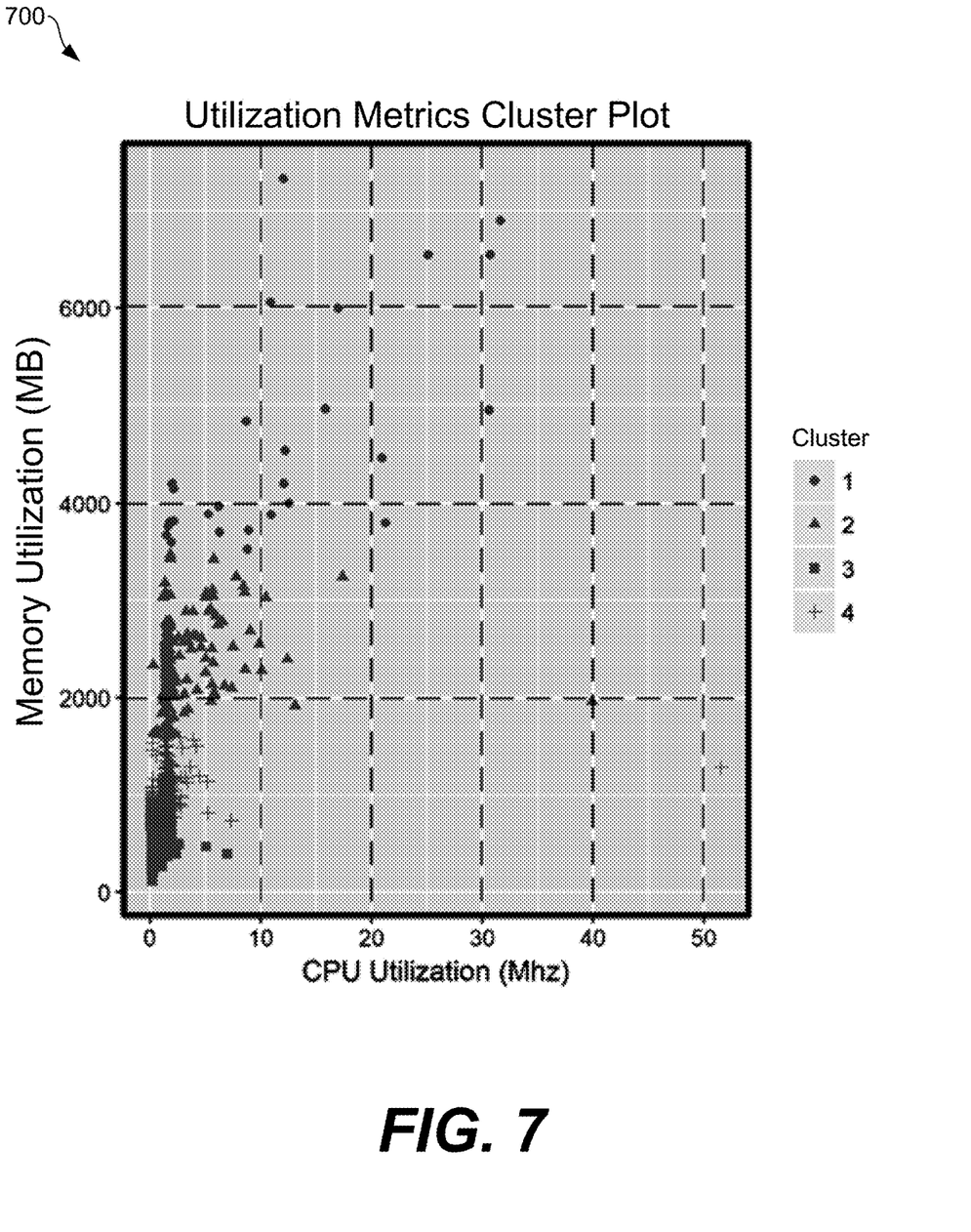

FIG. 7 illustrates an example cluster plot 700 having a range of CPU utilization along the horizontal axis and a range of memory utilization along the vertical axis. The cluster plot 700 includes a plot of 3,438 utilization metrics, each plotted as a point at an intersection of the memory utilization value and the CPU utilization value associated with it. Each of the utilization metrics has also been assigned to a respective cluster, as identified in the legend shown in FIG. 7 and Table 5 below.

TABLE 5

Assignment of Utilization Metrics to Clusters in FIG. 7

| | Cluster Number | | | |
|---|---|---|---|---|
| | 1 | 2 | 3 | 4 |
| Number of Utilization Metrics Assigned | 27 | 183 | 2440 | 788 |
| Percentage of Utilization Metrics Assigned | 0.7853403 | 5.322862 | 70.9714951 | 22.9203025 |

Referring to Table 5, it can be seen that over 70% of the utilization metrics plotted in FIG. 7 are assigned to cluster number 3. In a case such as this, the idle detector 136 can determine that the virtual machine from which the utilization metrics were collected is an idle virtual machine. The gathering of 70% of the utilization metrics in cluster number 3 means that the resource usage of the virtual machine does not vary significantly over time, which is an indicator that the virtual machine is idle.

Figure 8:
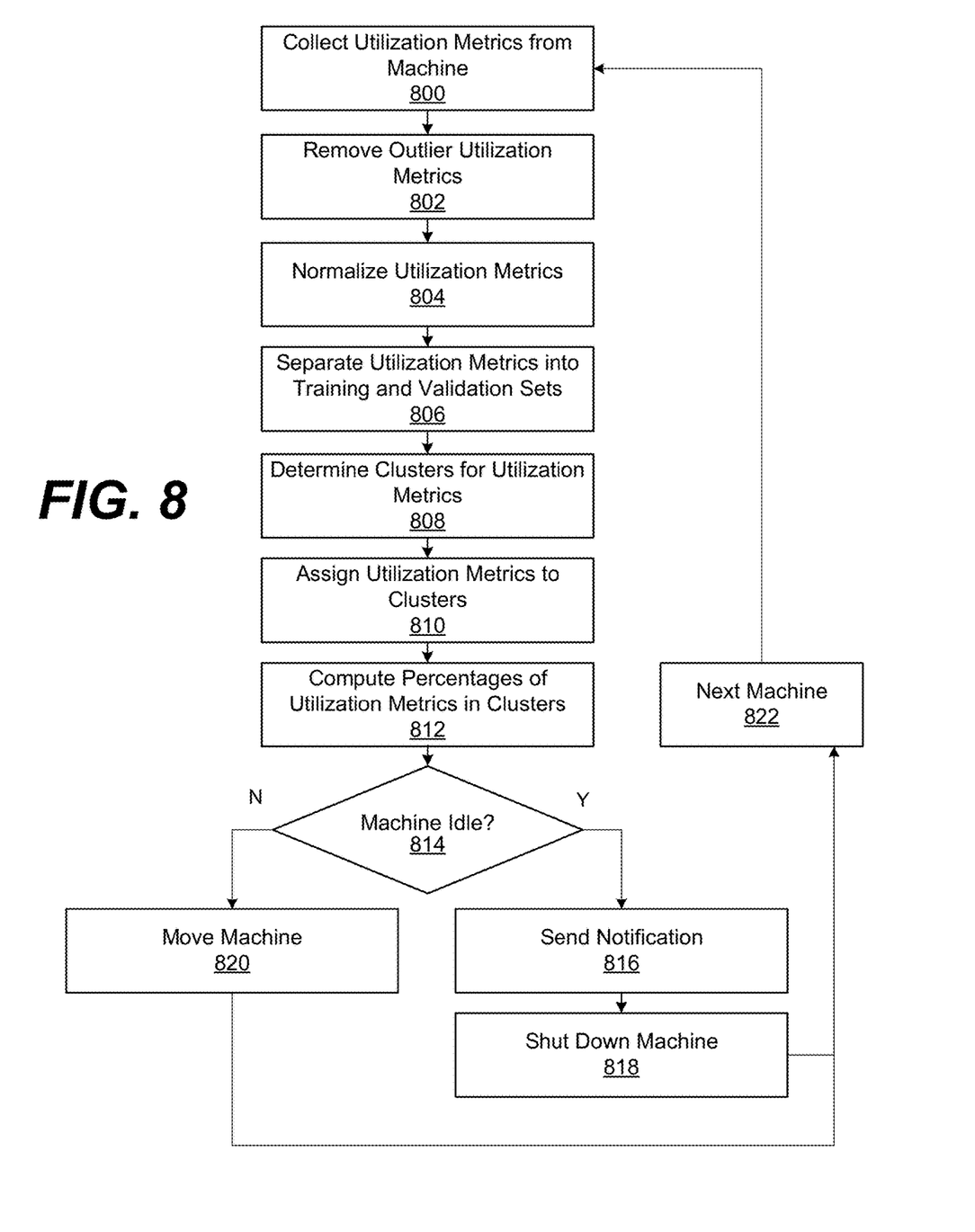
FIG. 8 illustrates a process for idle virtual machine detection through usage pattern analysis according to various examples described herein.

FIG. 8 illustrates a process for idle virtual machine detection through usage pattern analysis according to various examples described herein. The process illustrated in FIG. 8 is described in connection with the computing environment 100 and the virtual machine 140a shown in FIG. 1, although other computing environments could perform the process on other virtual machines. Although the flowcharts show a specific order of execution, the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

At step 800, the process includes the metric collector 132 collecting utilization metrics from a virtual machine over time. For example, the metric collector 132 can collect utilization metrics associated with the virtual machine 140a (among others) and store them in the utilization metric data 124 for further processing. A group or set of utilization metrics collected for the virtual machine 140a can be used to determine whether or not it is idle or being utilized in later steps in the process.

The utilization metrics can be related to one or more resource utilization or usage metrics, such as central processing unit (CPU) usage, disk input/output (I/O) usage, network I/O usage, and memory usage metrics. The utilization metrics can be gathered in any suitable unit of measure, such as processing speed or clock cycles (e.g., MHz, GHz, etc.), data usage or throughput (e.g., Mb, Mb/sec., etc.), or other unit(s) of measure. The utilization metrics can also be related to other qualitative or quantitative metrics, such as processing or data throughput speeds, processing delays, data synchronization tasks, user logins, number of function calls, number of API calls, traffic to or from certain network ports, and other types of usage information.

At step 802, the process includes the metric collector 132 removing outlier utilization metrics from among those collected at step 800. The metric collector 132 can remove or discard any utilization metrics which are not representative of the actual usage of the resources of the virtual machine 140a, such as metrics that are too large (e.g., above a threshold) or too small (e.g., below a threshold) to be representative. As another example, the metric collector 132 can remove or discard any utilization metrics which are significantly different (e.g., by a threshold amount or number of standard deviations, etc.) than a mean, median, or mode of the collected utilization metrics for the virtual machine 140a. Step 802 (and other steps) is optional and can be skipped in some cases.

At step 804, the process includes the metric collector 132 normalizing the utilization metrics. The metric collector 132 can normalize the utilization metrics so that the data can be processed by the cluster operator 134 in later steps in the process. The utilization metrics can be normalized by adjusting usage values among all the utilization metrics to a common scale. The normalization can also make adjustments to bring a distribution of the utilization metrics into alignment. Step 804 (and other steps) is optional and can be skipped in some cases.

At step 806, the process includes the metric collector 132 separating the utilization metrics collected at step 800 into a smaller set of training metrics and a larger set of validation metrics. As one example, a group of 5% or 10% of the total number of utilization metrics collected for the virtual machine 140a can be separated into a set of training metrics, and the remaining utilization metrics can be reserved as a set of validation metrics. The primary purpose of the set of training metrics can be to establish clusters for organizing the set of validation metrics for evaluation by the idle detector 136 in later steps in the process.

At step 808, the process includes the cluster operator 134 determining a number of clusters for the virtual machine 140a based on the set of training metrics for the virtual machine 140a. The cluster operator 134 can initialize the centers of the clusters in a manner similar to that described above with reference to FIG. 3. Each of the centers of the clusters can be initialized to have a different position. The cluster operator 134 can, initially, distribute the centers of each of the clusters evenly (or relatively evenly) among each other, with respect to a range of all of the utilization metrics in the set of training metrics.

The cluster operator 134 can also update the centers of the clusters based on the positions of the set of training metrics. The cluster operator 134 can calculate the distances between each of the utilization metrics in the set of training metrics and the centers of the clusters in a manner similar to that described above with reference to FIG. 3, to assign the utilization metrics to one of the clusters. To update the center position of each cluster, the cluster operator 134 can calculate an average of the distances between all the utilization metrics assigned to the cluster and the initial location of the center of the cluster. That average can be used to update or offset the initial position of the center of the cluster as described above with reference to FIG. 3.

At step 810, the process can include the cluster operator 134 assigning each utilization metric from the set of validation metrics for the virtual machine 140a to one of the clusters for the virtual machine 140a. The cluster operator 134 can assign each utilization metric to the cluster having the closest center, measured based on the values of the utilization metrics. In that way, each utilization metric from the set of validation metrics is assigned a cluster, resulting in an assignment similar to that shown in FIGS. 2 and 4-7.

At step 812, the process can include the idle detector 136 computing a percentage of utilization metrics for the virtual machine 140a assigned to each of the clusters of the virtual machine 140a. For example, the idle detector 136 can compute a number of utilization metrics assigned to a first one of the clusters as compared to the total number of utilization metrics assigned to all of the clusters, similar to the percentages shown in Tables 1-5 above.

At step 814, the process can include the idle detector 136 determining whether or not the virtual machine 140a is an idle or utilized machine. The idle detector 136 can determine whether the virtual machine 140a is idle or utilized based on an evaluation of the number or percentage of utilization metrics assigned to each of the clusters. In one example, the idle detector 136 can determine that the virtual machine 140a is an idle virtual machine when a percentage of utilization metrics assigned to one of the clusters (among the total number of utilization metrics assigned to all the clusters) is equal to or greater than a configurable predetermined percentage, such as 50%, 60%, or 70%. In that case, the percentage of utilization metrics assigned to one of the clusters is larger than that assigned to all of the other clusters, and the process proceeds to step 816. In another example, the idle detector 136 can determine that the virtual machine 140a is a utilized (i.e., not idle) virtual machine when the percentage of utilization metrics assigned to two or more of the plurality of clusters is equal to or greater than a configurable predetermined percentage, such as 25%, 33%, or 40%, and the process proceeds in that case to step 820.

At step 816, the process includes the idle detector 136 sending a notification to an administrator or owner of the virtual machine 140a because it is determined to be idle. The administrator or owner may be notified that the virtual machine 140a is scheduled to be shut down at a particular date in the future. Additionally or alternatively, the notification may request that the administrator or owner shut the machine down within a certain timeframe. At step 818, the process can also include the idle detector 136 instructing the machine manager 140 to shut the virtual machine 140a down.

On the other hand, if the virtual machine 140a is determined to be a utilized machine at step 814, the idle detector 136 can work with the machine manager 140 to migrate the virtual machine 140a to another host computing device at step 820. The virtual machine 140a can be migrated from the computing environment 110 to the host computing device 170, for example. Alternatively, step 820 can be skipped, and the virtual machine 140a can continue to be hosted on the computing environment 110.

From either step 820 or step 818, the process can continue to step 822. At step 822, the utilization detector 130 can refocus on the next virtual machine, such as the virtual machine 140b for detection. Finally, the process can proceed back to step 800 for the evaluation of the next virtual machine.

The flowchart shown in FIG. 8 shows an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing environment 100 can include at least one processing circuit. Such a processing circuit can include, for example, one or more processors and one or more storage devices that are coupled to a local interface. The local interface can include, for example, a data bus with an accompanying address/control bus or any other suitable bus structure.

The storage devices for a processing circuit can store data or components that are executable by the processors of the processing circuit. For example, the utilization detector 130, the machine manager 140, and/or other components can be stored in one or more storage devices and be executable by one or more processors in the computing environment 100. Also, a data store, such as the data store 120, can be stored in the one or more storage devices.

The utilization detector 130, the machine manager 140, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the utilization detector 130, the machine manager 140, and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code for detecting idle virtual machines that, when executed by at least one computing device, directs the at least one computing device to at least:
   collect a plurality of utilization metrics from a virtual machine;
   separate the plurality of utilization metrics into a set of training metrics and a set of validation metrics;
   determine a plurality of clusters to be used for organizing the plurality of utilization metrics into groups based on the set of training metrics, the plurality of clusters being initialized based on different resources utilized by the virtual machine;
   assign individual utilization metrics from among the set of validation metrics to individual ones of the plurality of clusters;
   compute a percentage of utilization metrics assigned to individual ones of the plurality of clusters; and
   determine that the virtual machine is an idle virtual machine in response to the percentage of utilization metrics assigned to one of the plurality of clusters being equal to or greater than a predetermined percentage.

2. The non-transitory computer-readable medium according to claim 1, wherein the program code further directs the at least one computing device to at least remove outlier utilization metrics from among the plurality of utilization metrics.

3. The non-transitory computer-readable medium according to claim 1, wherein the program code further directs the at least one computing device to at least normalize the plurality of utilization metrics.

4. The non-transitory computer-readable medium according to claim 1, wherein individual ones of the plurality of utilization metrics comprise at least one of a processing unit utilization metric, a disk input/output (I/O) utilization metric, a network I/O utilization metric, and a memory utilization metric.

5. The non-transitory computer-readable medium according to claim 4, wherein, to determine the plurality of clusters, the program code further directs the at least one computing device to at least:
   initialize a center of at least one cluster among the plurality of clusters, the center being initialized based on a metric unit of at least one of processing unit utilization, disk I/O utilization, network I/O utilization, and a memory utilization for the virtual machine;
   attribute a number of utilization metrics from among the set of training metrics to the at least one cluster based on a difference between individual ones of the number of utilization metrics and the center of the at least one cluster; and
   update the center of the at least one cluster based on an average of the difference between individual ones of the number of utilization metrics from among the set of training metrics and the center of the at least one cluster.

6. The non-transitory computer-readable medium according to claim 4, wherein the program code further directs the at least one computing device to at least notify an owner of the virtual machine that the virtual machine is idle.

7. The non-transitory computer-readable medium according to claim 4, wherein the program code further directs the at least one computing device to at least notify an owner of the virtual machine that the virtual machine is being shut down.

8. The non-transitory computer-readable medium according to claim 4, wherein the program code further directs the at least one computing device to at least shut down the virtual machine.

9. A method for detecting idle virtual machines, comprising:
   collecting, by at least one computing device, a plurality of utilization metrics from a virtual machine;
   determining, by the at least one computing device, a plurality of clusters to be used for organizing the plurality of utilization metrics into groups, the plurality of clusters being initialized based on different resources utilized by the virtual machine;
   assigning, by the at least one computing device, individual utilization metrics from among the plurality of utilization metrics to individual ones of the plurality of clusters;
   computing, by the at least one computing device, a percentage of utilization metrics assigned to individual ones of the plurality of clusters; and
   determining, by the at least one computing device, that the virtual machine is an idle virtual machine in response to the percentage of utilization metrics assigned to one of the plurality of clusters being equal to or greater than a predetermined percentage.

10. The method for detecting idle virtual machines according to claim 9,
   further comprising notifying an owner of the virtual machine that the virtual machine is idle.

11. The method for detecting idle virtual machines according to claim 9, further comprising:
   determining, by the at least one computing device, that the virtual machine is a utilized virtual machine in response to the percentage of utilization metrics assigned to two of the plurality of clusters being equal to or greater than a predetermined percentage.

12. The method for detecting idle virtual machines according to claim 9, further comprising:
   separating, by the at least one computing device, the plurality of utilization metrics into a set of training metrics and a set of validation metrics; and
   determining the plurality of clusters based on the set of training metrics.

13. The method for detecting idle virtual machines according to claim 9, further comprising:
   removing, by the at least one computing device, outlier utilization metrics from among the plurality of utilization metrics; and
   normalizing, by the at least one computing device, the plurality of utilization metrics.

14. The method for detecting idle virtual machines according to claim 9, wherein individual ones of the plurality of utilization metrics comprise at least one of a processing unit utilization metric, a disk input/output (I/O) utilization metric, a network I/O utilization metric, and a memory utilization metric.

15. The method for detecting idle virtual machines according to claim 14, wherein determining the plurality of clusters comprises:
   initializing, by the at least one computing device, a center of at least one cluster among the plurality of clusters, the center being initialized based on a metric unit of at least one of processing unit utilization, disk I/O utilization, network I/O utilization, and a memory utilization for the virtual machine;
   attributing, by the at least one computing device, a number of utilization metrics from among the plurality of utilization metrics to the at least one cluster based on a difference between individual ones of the number of utilization metrics and the center of the at least one cluster; and
   updating, by the at least one computing device, the center of the at least one cluster based on an average of the difference between individual ones of the number of utilization metrics and the center of the at least one cluster.

16. A system for detecting idle virtual machines, comprising:
   a memory device configured to store computer-readable instructions thereon; and
   at least one computing device configured, through execution of the computer-readable instructions, to at least:
   collect a plurality of utilization metrics from a virtual machine;
   separate the plurality of utilization metrics into a set of training metrics and a set of validation metrics;
   determine a plurality of clusters to be used for organizing the plurality of utilization metrics into groups based on the set of training metrics, the plurality of clusters being initialized based on different resources utilized by the virtual machine;
   assign individual utilization metrics from among the set of validation metrics to individual ones of the plurality of clusters;
   compute a percentage of utilization metrics assigned to individual ones of the plurality of clusters; and
   determine that the virtual machine is an idle virtual machine in response to the percentage of utilization metrics assigned to one of the plurality of clusters being equal to or greater than a predetermined percentage.

17. The system according to claim 16, wherein the at least one computing device is further configured to at least:
   remove outlier utilization metrics from among the plurality of utilization metrics; and
   normalize the plurality of utilization metrics.

18. The system according to claim 16, wherein individual ones of the plurality of utilization metrics comprise at least one of a processing unit utilization metric, a disk input/output (I/O) utilization metric, a network I/O utilization metric, and a memory utilization metric.

19. The system according to claim 18, wherein the at least one computing device is further configured to at least:
   initialize a center of at least one cluster among the plurality of clusters, the center being initialized based on a metric unit of at least one of processing unit utilization, disk I/O utilization, network I/O utilization, and a memory utilization for the virtual machine;
   attribute a number of utilization metrics among the set of training metrics to the at least one cluster based on a difference between individual ones of the number of utilization metrics and the center of the at least one cluster; and update the center of the at least one cluster based on an average of the difference between individual ones of the number of utilization metrics from among the set of training metrics and the center of the at least one cluster.

* * * * *